May 3, 1955 M. MAY 2,707,591

MULTIPLE-STABLE-STATE STORAGE DEVICES

Filed May 7, 1952 4 Sheets-Sheet 1

INVENTOR.
MICHAEL MAY,
BY Lester S. Hecht
ATTORNEY.

May 3, 1955 M. MAY 2,707,591

MULTIPLE-STABLE-STATE STORAGE DEVICES

Filed May 7, 1952 4 Sheets-Sheet 2

INVENTOR.
MICHAEL MAY,
BY Lester S. Hecht
ATTORNEY.

May 3, 1955 M. MAY 2,707,591

MULTIPLE-STABLE-STATE STORAGE DEVICES

Filed May 7, 1952 4 Sheets-Sheet 3

INVENTOR.
MICHAEL MAY,
BY Lester S. Hecht
ATTORNEY.

May 3, 1955 M. MAY 2,707,591

MULTIPLE-STABLE-STATE STORAGE DEVICES

Filed May 7, 1952 4 Sheets-Sheet 4

INVENTOR.
MICHAEL MAY,
BY Lester S. Hecht
ATTORNEY.

United States Patent Office 2,707,591

Patented May 3, 1955

2,707,591

MULTIPLE-STABLE-STATE STORAGE DEVICES

Michael May, Los Angeles, Calif., assignor, by mesne assignments, to Hughes Aircraft Company, a corporation of Delaware

Application May 7, 1952, Serial No. 286,473

18 Claims. (Cl. 235—61)

Figure 1:
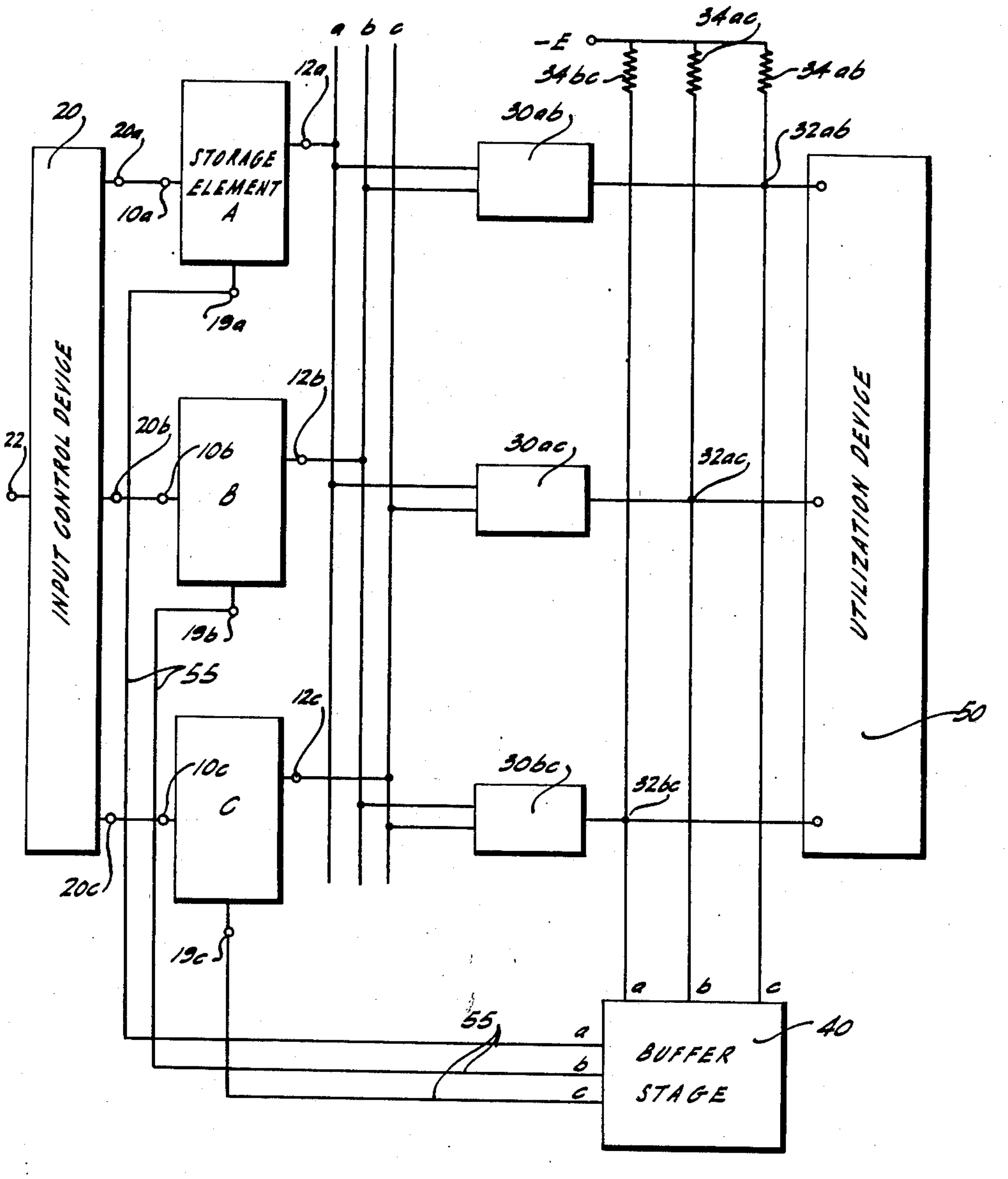

This invention relates to multiple-stable-state storage devices, and more particularly to a multiple-stable-state storage device which utilizes a plurality of two-state storage elements interconnected into combinatorial groups.

In a high-speed digital computer machine it is frequently necessary to provide for the temporary storage of digital information which is to be utilized in a later operation of the machine. Various means have been devised for this temporary storage and are referred to, in the art, as transitory or high-speed storage devices. The most important requirement of such a device is that it have a short access time, that is, the time required for storing information in and for extracting information from the device must be small as compared to the time required for storing information in and for extracting information from a permanent storage device.

Many of the presently known high-speed storage devices utilize a plurality of two-stable-state devices referred to, in the art, as flip-flops. A flip-flop comprises two two-state elements, such as electron discharge tubes, magnetically-saturable elements, transistors, etc. Each of the elements in a flip-flop is coupled to the other so that in each stable state of the flip-flop an element in one state holds the other element in the alternate state.

When flip-flops are utilized for the storage of a binary-coded number, a flip-flop must be provided for each binary place of the number. For example, if it is desired to store any binary-coded number from zero to fifteen, four flip-flops must be provided, or, in terms of individual elements, eight individual storage elements are required. As will be seen, such an arrangement does not make the most economical use of the individual storage elements, because many of the control combinations are not utilized.

The present invention discloses a novel multiple-stable-state storage device which utilizes fewer individual storage elements than are used in the storage devices of the prior art. The basic principle of the present invention is the utilization of a plurality of two-state storage elements to provide a multiple-state storage device by interconnecting their output circuits into a first plurality of combinatorial groups, each group comprising the same number of storage elements. The input circuits of the storage elements are connected into a second plurality of combinatorial groups which are complementary, respectively, to the groups of the first plurality. The first and second pluralities of groups are interconnected in a manner such that when all the elements of a group are in one state the elements of the complementary group are in the alternate state.

A combinatorial group, as referred to hereinafter in the specification and claims, is defined as one of the plurality of possible combinations of $n$ things taken $r$ at a time (where $n$ is any integer greater than 2 and $r$ is any integer less than $n$). For example, the combinatorial groups of A, B, and C, taken two at a time, are AB, AC, and BC. According to the principles of class algebra, a combinatorial group is the complement of another combinatorial group when each is a subclass or group of the same "universal" class and when one contains those members of the universal class which are not members of the other. Thus, in the universal class ABCD, the combinatorial group AB is complementary to the combinatorial group CD. The theory of class algebra is more fully explained on page 8 of the "The Theory of Functions of Real Variables" by Lawrence M. Graves, published by McGraw-Hill Book Company, Inc. in 1946.

In one embodiment of the present invention, the combinatorial output and complementary combinatorial control connections are made as follows: The storage element output circuits are connected by a plurality of separate impedances into a first plurality of combinatorial groups. For example, individual storage elements, A, B, C, and D have their output circuits coupled through separate impedances into a first plurality of combinatorial groups AB, AC, AD, BC, BD, and CD, where each of the combinatorial groupings requires two separate impedances. Each of these combinatorial groups has an output end which is coupled through a separate buffer stage to the control circuits of the storage elements in the respective complementary combinatorial group. Thus, output combinatorial groups AB, AC, AD, BC, BD, and CD are coupled, respectively, to complementary combinatorial control groups CD, BD, BC, AD, AC, and AB.

When all the elements in a particular combinatorial output group are in a predetermined state as, for example, the conduction state of an electron discharge tube or a flux saturation state of a magnetic element, a control signal is applied to the control circuits of the complementary control group of storage elements for maintaining them in the other state. As a result, the device will assume a number of stable states equal in number to the number of combinatorial output groups. Where electron discharge tubes are used as storage elements, the output control may be derived from the anodes and the control signal may be applied to the grids.

If $n$ storage elements are utilized and combined into combinatorial output groups, each having $r$ output circuits, then the storage device will have $$_{n}C_{r}$$

stable states where $$_{n}C_{r}$$

represents the number of combinations of $n$ things taken $r$ at a time. Thus, with seven storage elements, and either three or four elements in each combinatorial group, it is possible to provide thirty-five stable states. A flip-flop storage device for storing thirty-five code combinations would require six flip-flops or twelve storage elements. It should be clear then, from this example, that the present invention makes it possible to use fewer individual storage elements to provide the same number of stable states as would be possible with a similar flip-flop device.

Another advantage of the present invention over the binary-coded type of storage device is that it provides a convenient error-checking code. It is usually necessary in the flip-flop type of storage device to provide an extra binary place or flip-flop to represent a parity check digit. The combinatorial code utilized in the present invention is inherently self-checking, since for any stable state of the device the same number of storage elements are in a predetermined one of the two states. For example, if seven storage elements are utilized and the code calls for three of them to be in a conducting condition at the same time, the error-checking device senses whether or not three of the storage elements are conducting at all times.

Accordingly, it is an object of the present invention to provide a multiple-stable-state device which combines a plurality of two-state storage elements into a first plurality of combinatorial output groups and a second plurality of complementary combinatorial control groups connected to said combinatorial output groups, respectively.

Another object of the present invention is to provide a multiple-stable-state device which requires fewer individual storage elements than would be required in a conventional storage device.

A further object of the present invention is to provide a multiple-stable-state device which combines a plurality of two-state storage elements into a combinatorial output and a complementary combinatorial input or control arrangement to provide a larger ratio of possible stable states to storage elements required.

Still another object is to provide a decimal storage device which utilizes only five individual storage elements.

The novel features which are believed to be characteristic of the invention, both as to its organization and method of operation, together with further objects and advantages thereof, will be better understood from the following description considered in connection with the accompanying drawings, in which several embodiments of the invention are illustrated by way of examples. It is to be expressly understood, however, that the drawings are for the purpose of illustration and description only, and are not intended as a definition of the limits of the invention.

Fig. 1 is a block diagram of one embodiment of the present invention; and

Figure 2:
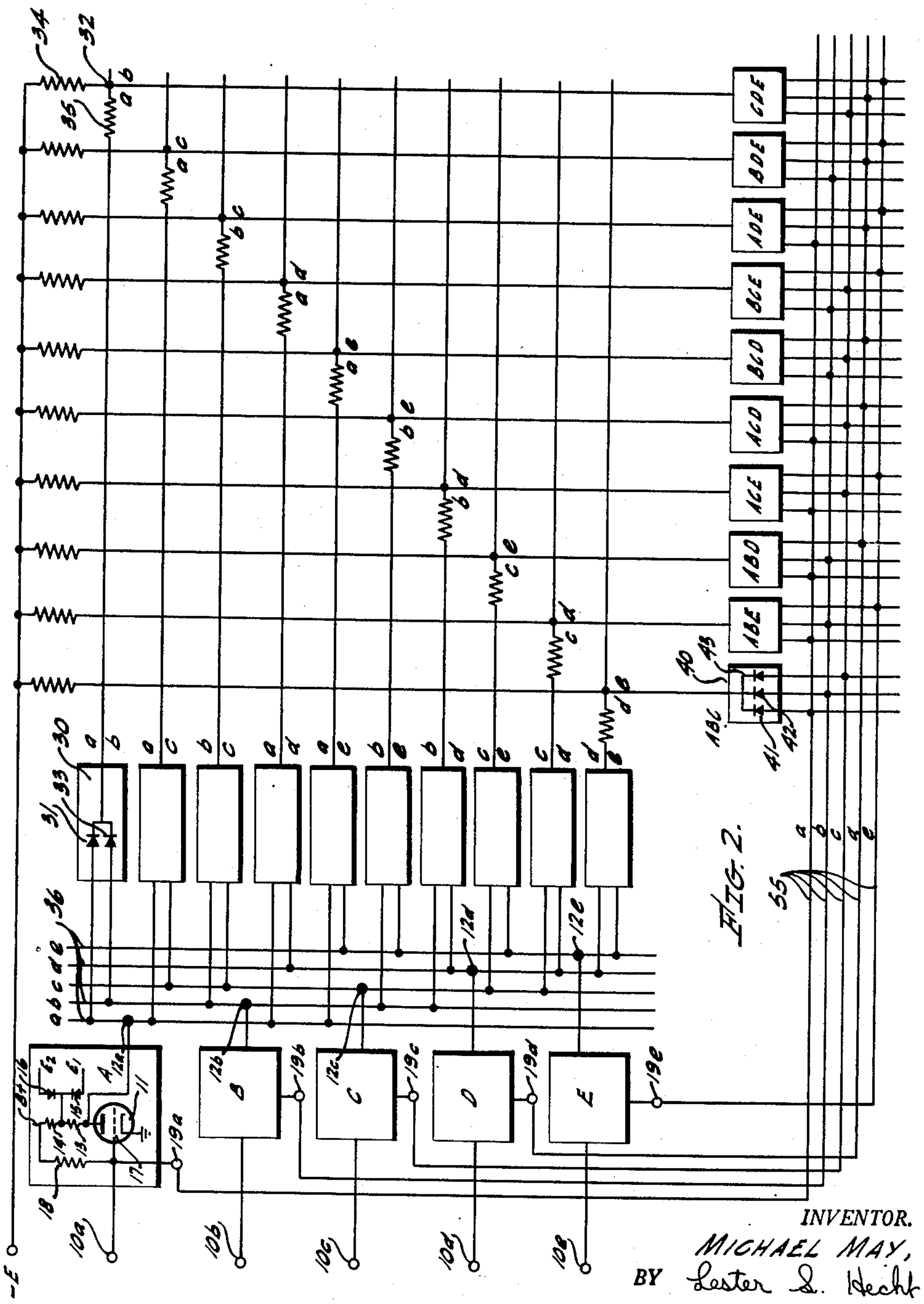
Figure 3:
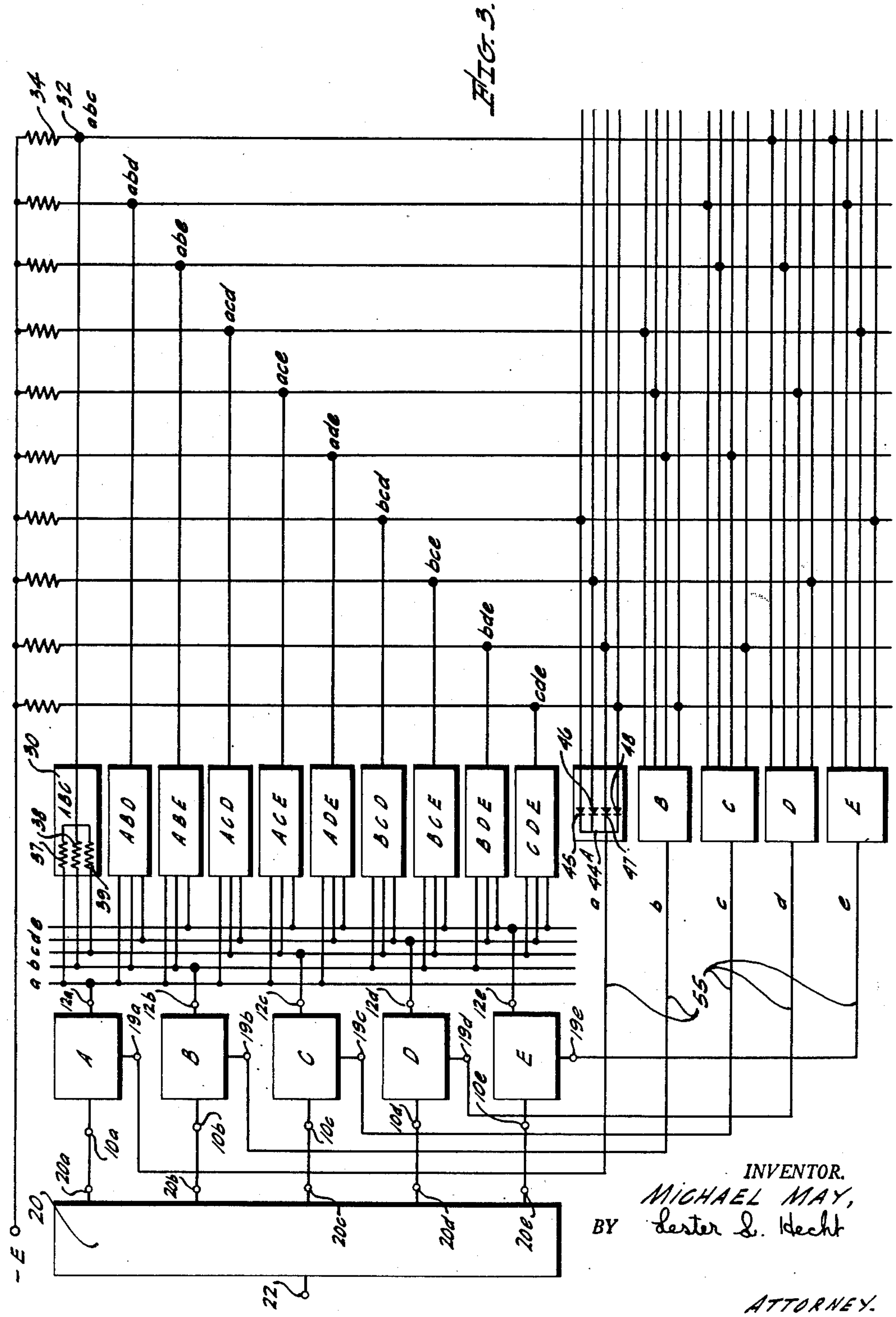
Figure 4:
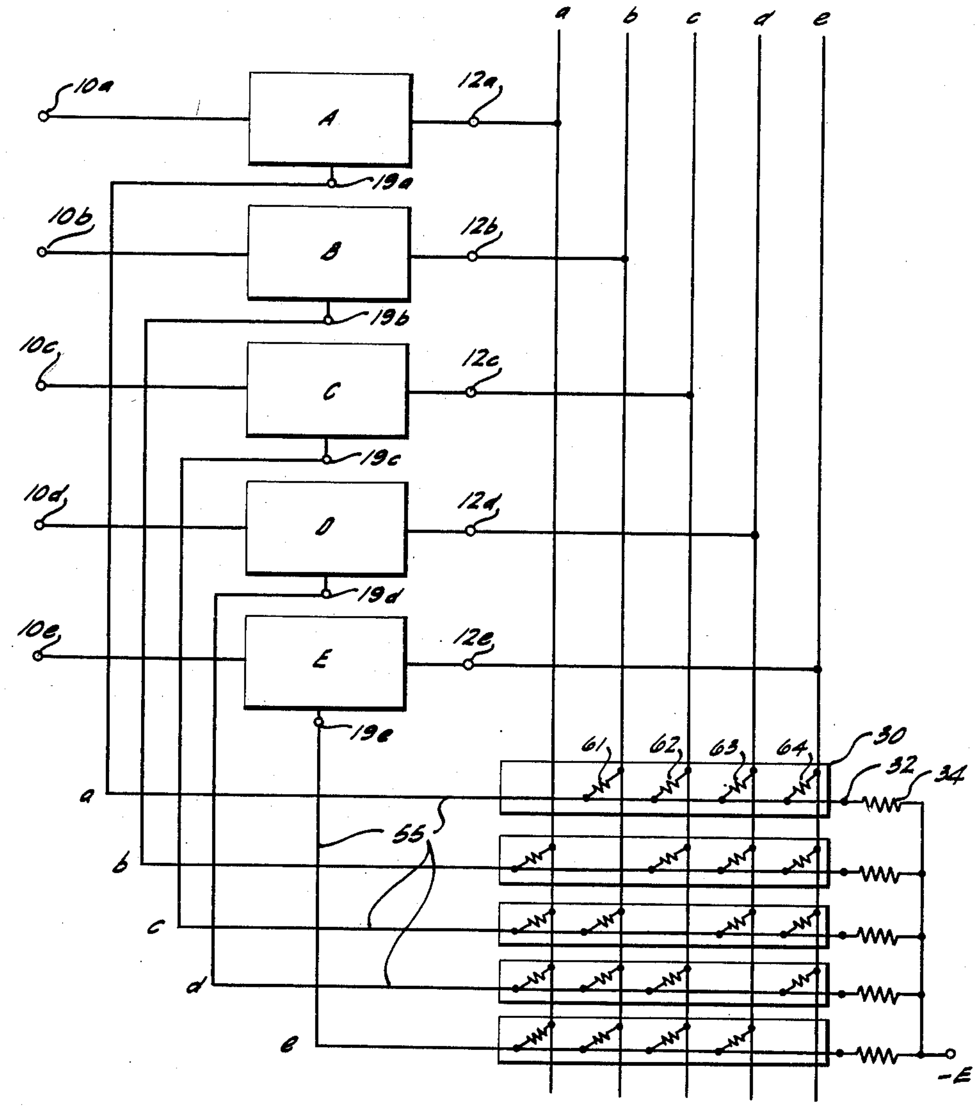

Figs. 2, 3, and 4 are schematic diagrams of other embodiments of the present invention.

Referring now to the drawings, there is shown in Fig. 1 three storage elements A, B, and C having input terminals 10*a*, 10*b*, and 10*c* connected, respectively, to output terminals 20*a*, 20*b*, and 20*c* of an input control device 20. Signals representative of coded information to be stored in storage elements A, B, and C are applied to an input terminal 22 of the input control device which produces signals in the desired combinatorial code at its output terminals.

The storage elements have their output terminals 12*a*, 12*b*, and 12*c* connected into a first plurality of combinatorial groups by means of combinatorial grouping means 30*ab*, 30*ac*, and 30*bc*, having output ends 32*ab*, 32*ac*, and 32*bc*, respectively, connected through separate biasing impedances 34*ab*, 34*ac*, and 34*bc*, respectively, to a terminal —E of a source of biasing potential, not shown. The magnitudes of the biasing impedances and the source of biasing potential are such that when two storage elements connected to the input terminals of one of the combinatorial grouping means are in a predetermined one of the two states, the output end of the combinatorial grouping means provides a control signal which maintains the complementary group of storage elements in the other of the two states.

If signals representative of coded information to be stored are applied to storage elements A and B which place these elements in the predetermined one of the two states, a control signal is produced at output end 32*ab* of combinatorial grouping means 30*ab*. In the example given, this control signal is then applied through a buffer stage 40 to control terminal 10*c* of storage element C. As a result, after the termination of the input signals, the storage device will remain in a stable state representative of the coded information. For example, storage elements A and B will be in the predetermined stable state and storage element C will be maintained in the other stable state.

A utilization device 50 is connected to output ends 32*ab*, 32*ac*, and 32*bc*. Utilization device 50 may use the stored information in the combinatorial code as it is stored, or it may translate it into some other code for further operation.

An example of an input control device for translating coded information into the combinatorial code of the storage device is a switching matrix, such as that shown and described in pages 40 to 43 of "High-Speed Computing Devices," by Engineering Research Associates, published in 1950 by McGraw-Hill Book Company, Inc., New York and London. The storage elements are two-state devices, such as electron discharge tubes, magnetically-saturable elements, transistors, thermistors, etc., the only requirement being that it is possible to derive, from a storage element in one state, an output signal which may be used to maintain other storage elements in the alternate state. Structures illustrative of the combinatorial grouping means and the buffer stage are shown in Figs. 2, 3, and 4. The utilization device is any signal-responsive device. It may be responsive directly to the combinatorial output signals, or it may include a switching matrix, of the type utilized as the input control device, for first converting the output signals to the desired utilization code.

In order to explain the operation of the device, it is assumed that each storage element has an "on" state and an "off" state. For example, the "on" state may represent conduction of an electron discharge tube or positive saturation of a magnetically-saturable element, and the "off" state may represent the non-conduction of the electron discharge tube or negative saturation of a magnetically-saturable element. It is assumed further that it is desired to store information in the form of a combinatorial code in the three-storage-element device of Fig. 1 wherein each code combination has two "on" signals and one "off" signal.

Each combinatorial grouping means must provide an "off" control signal at its output end when there are two "on" signals applied to its input end. For example, combinatorial grouping means 30*ab* must provide an "off" control signal when, and only when, both storage elements A and B are in the "on" condition. The "off" control signal at the output end of the combinatorial grouping means is applied to the control terminals of the storage elements in the complementary group. In the simplified case of Fig. 1, only one element, C, is in the complementary group of AB.

Symbolically we can represent the operation of the device shown in Fig. 1 in terms of a first set of logical Boolean implications:

$$A.B \rightarrow \overline{C}$$

$$A.C \rightarrow \overline{B}$$

$$B.C \rightarrow \overline{A}$$

which are defined as follows: A and B "on" implies C "off," A and C "on" implies B "off," and B and C "on" implies A "off." In other words, the dot between the letters representing the elements signifies that an "and" condition is to be fulfilled, the arrow signifies "implies," and the bar over the letter representing the storage element signifies that the storage element is in an "off" condition.

From the first set of logical implications, it can be seen that each of the combinatorial grouping means may be considered as an "and" gate, for the "on" input signals applied to it, which provides an "off" control signal when the "and" conditions of the gate are satisfied.

The structure of Fig. 1 can also be considered in terms of a second set of logical Boolean implications:

$$\overline{A}+\overline{B} \rightarrow C$$

$$\overline{A}+\overline{C} \rightarrow B$$

$$\overline{B}+\overline{C} \rightarrow A$$

which signify that A or B "off" implies C "on," A or C "off" implies B "on," and B or C "off" implies A "on." The plus sign between letters signifies the logical "or" relationship between the elements.

From the second set of logical implications, it can be seen that each of the combinatorial grouping means may be considered as an "or" gate for producing an "on" control signal in response to "off" input signals.

The second set of logical implications can be derived from the first by well-known Boolean algebraic manipulations, if the first set are considered to be reversible. For a complete understanding of Boolean algebraic manipulations, reference should be made to pages 331–332 of "A Survey of Modern Algebra" by Birkhoff and MacLane, published in 1941 by MacMillan & Company.

Many embodiments of the three-state device shown in Fig. 1 can be formulated by Boolean algebraic manipulation of the basic logic. Moreover, the same logical approach may be utilized to devise storage devices employing more than three elements.

Referring now to Fig. 2, there is shown a ten-state storage device wherein each of the storage elements A, B, C, D, and E comprises an electron discharge tube 11. In order to simplify the drawing, only one tube and associated circuitry is shown, and corresponding components of, or associated with, each of the storage elements are given the same reference numeral, but are distinguished by the addition of the letters *a, b, c, d,* or *e* which designate the particular storage element.

The anode of each tube is coupled to B+ through two load resistors 13 and 14, connected in series. The junction of the two load resistors is connected to a voltage clamping network which comprises two diodes 15 and 16. The clamping network provides reference voltages representative of the conduction and non-conduction state of the tube. When a tube is conducting its anode is clamped at a relatively low voltage $E_1$ which is applied to the anode of diode 15 in the clamping network, whereas, when the tube is non-conducting, the anode voltage is clamped at a relatively high voltage $E_2$ which is applied to the cathode of diode 16 of the voltage clamping network. A tube is considered "on" when it is conducting and its anode voltage is at low voltage $E_1$, and is considered "off" when it is non-conducting and its anode voltage is at high voltage $E_2$. Grid 17 of each tube is connected to B+ by means of a bias resistor 18. As a result, the tubes are normally conducting unless a cutoff bias is applied to the grid in a manner to be described.

Each storage element has an input terminal 10 which is connected to the grid of its tube, an output terminal 12 which is connected to the anode of the tube, and a control terminal 19 which is connected to the grid of the tube. Means 30 are provided for connecting the output terminals of the storage elements into a first plurality of combinatorial groups, the elements in, or associated with, each of the combinatorial grouping means being given the same reference numeral, but being distinguished by the letters which designate the particular group. Each combinatorial grouping means includes two diodes 31 and 33, the anode of each diode being connected to an output terminal lead 36 which is connected to the output terminal of one of the storage elements in the combinatorial group. For example, in combinatorial grouping means 30*ab*, the anode of diode 31*ab* is connected to output terminal lead 36*a* of storage element A, and the anode of diode 33*ab* is connected to output terminal lead 36*b* of storage element B.

The cathodes of the diodes in each combinatorial grouping means are connected together and to one end of a first biasing resistor 35, the other end of each first biasing resistor being connected by a separate second biasing resistor 34 to terminal —E of a source of biasing potential, not shown. The junction of each pair of biasing resistors is referred to as output end 32 of a combinatorial grouping means. For example, junction 32*ab* is the output end of combinatorial grouping means 30*ab*. The output end of each combinatorial grouping means is coupled through one of a plurality of diode buffer stages 40 to the control terminals of the storage elements in a complementary combinatorial group. Thus, output end 32*bc* of grouping means 30*bc* is coupled through diode buffer stage 40*ade* to control terminals 19 of each of storage elements, A, D, and E.

Each of the diode buffer stages includes three diodes 41, 42, and 43, such as those shown in diode buffer stage 40*abc*. The anode of each of the diodes in a buffer stage is connected to the control terminal lead 55 of one of the storage elements in the complementary group. For clarity, the diodes are shown connected to the control terminals of the storage elements in the same sequence as is the sequence of the letters in the stage designation. Thus, the diode at the extreme left in the diode buffer stage 40*abc* is connected to the control terminal of storage element A, the diode in the center of the group is connected to the control terminal of storage element B, and the diode at the right is connected to the control terminal of storage element C. The cathodes of each of the diodes are connected together and to output end 32 of the corresponding combinatorial grouping means.

In operation when any two tubes are conducting, output end 32 of the corresponding combinatorial grouping means provides a control signal or a negative bias which is applied through the corresponding buffer diode stage to the control terminals of the complementary group of storage elements. The magnitude of the negative bias is determined by the values which are selected for the biasing resistors and the potential of the negative biasing source, and is made sufficiently negative so that the tubes in the complementary group are maintained in the non-conductive state. Assuming the convention of "on" for the conduction state of a tube and "off" for the non-conduction state, and that the combinatorial code which is to be stored requires that two storage elements be "on" at a time, then the logic of the circuit shown in Fig. 2 can be represented in terms of a basic set of logical Boolean implications:

$$A.B \rightarrow \overline{C}\overline{D}\overline{E}$$

$$A.C \rightarrow \overline{B}\overline{D}\overline{E}$$

$$B.C \rightarrow \overline{A}\overline{D}\overline{E}$$

$$A.D \rightarrow \overline{B}\overline{C}\overline{E}$$

$$A.E \rightarrow \overline{B}\overline{C}\overline{D}$$

$$B.E \rightarrow \overline{A}\overline{C}\overline{D}$$

$$B.D \rightarrow \overline{A}\overline{C}\overline{E}$$

$$C.D \rightarrow \overline{A}\overline{B}\overline{E}$$

$$C.E \rightarrow \overline{A}\overline{B}\overline{D}$$

$$D.E \rightarrow \overline{A}\overline{B}\overline{C}$$

For example, the implication $$A.B \rightarrow \overline{C}\overline{D}\overline{E}$$

means that storage elements A and B "on" implies storage elements C, D, and E "off." Structurally, each of the combinatorial grouping means can be considered as an "and" gate which provides an "off" control signal when both of the storage elements connected to the input of the gate are "on." This "off" control signal is then coupled through an associated diode buffer stage to the grids of the tubes in the complementary group.

By well-known Boolean algebraic methods, the basic set of logical implications shown above can be converted into other sets of logical implications. For example, a first set of logical implications would be:

$$B.C+B.E+B.D+C.E+C.D+D.E\rightarrow\bar{A}$$

$$A.C+A.D+A.E+C.E+C.D+D.E\rightarrow\bar{B}$$

$$A.B+A.D+A.E+B.E+B.D+D.E\rightarrow\bar{C}$$

$$A.B+A.C+B.C+A.E+B.E+C.E\rightarrow\bar{D}$$

$$A.B+A.C+B.C+A.D+B.D+C.D\rightarrow\bar{E}$$

A second set of logical implications, derivable from the basic logic shown below, but applicable to the circuit shown in Fig. 2, would be:

$$(\bar{B}+\bar{C}).(\bar{B}+\bar{E}).(\bar{B}+\bar{D}).(\bar{C}+\bar{E}).(\bar{C}+\bar{D}).(\bar{D}+\bar{E})\rightarrow A$$

$$(\bar{A}+\bar{C}).(\bar{A}+\bar{D}).(\bar{A}+\bar{E}).(\bar{C}+\bar{E}).(\bar{C}+\bar{D}).(\bar{D}+\bar{E})\rightarrow B$$

$$(\bar{A}+\bar{B}).(\bar{A}+\bar{D}).(\bar{A}+\bar{E}).(\bar{B}+\bar{E}).(\bar{B}+\bar{D}).(\bar{D}+\bar{E})\rightarrow C$$

$$(\bar{A}+\bar{B}).(\bar{A}+\bar{C}).(\bar{B}+\bar{C}).(\bar{A}+\bar{E}).(\bar{B}+\bar{E}).(\bar{C}+\bar{E})\rightarrow D$$

$$(\bar{A}+\bar{B}).(\bar{A}+\bar{C}).(\bar{B}+\bar{C}).(\bar{A}+\bar{D}).(\bar{B}+\bar{D}).(\bar{C}+\bar{D})\rightarrow E$$

The first set of logical implications signifies that each combinatorial grouping means is an "and" gate which produces an "off" control signal when both input signals applied to it are "on" signals, and that the control terminal of each storage element is connected to the ouput of an "or" gate. The input ends of the "or" gate are connected to the output ends of the combinatorial grouping means or "and" gates which exclude the storage element associated with the "or" gate. For example, the control terminal of storage element A can be considered as being connected to an "or" gate which has its input ends connected to the output ends of combinatorial grouping means or "and" gates 30*bc*, 30*be*, 30*bd*, 30*ce*, 30*cd*, and 30*de*.

The logic of the first set signifies that when any two of the combinatorial groups of elements which do not include A are "on," A must be "off." This must be so because the original assumption was that the code requires that only two elements be "on" at a time.

The second set of logical implications can be interpreted structurally to mean that each control terminal is connected to the output terminal of an "and" gate which has its input ends connected to the output ends of a plurality of "or" gates provided by the combinatorial grouping means. For example, in Fig. 2, the A control lead 55*a* is the output terminal of an "and" gate which has its input ends connected to the output ends of all combinatorial grouping means or "or" gates which are not connected to the output terminal of storage element A.

The second set of implications is complementary to the first and signifies when a storage element is "on" in terms of the "off" conditions of the other storage elements, whereas the first set signifies when a storage element is "off" in terms of the "on" conditions of the other storage elements. According to the second set of implications, each combinatorial grouping means is an "or" gate which provides an "on" control signal when either one or both of the elements in the group is "off."

The logical implications above are based upon the basic logical implication that two elements in the "on" condition maintain the complementary group of three elements in the "off" condition. A second basic logical implication which may be utilized is that three elements in the "off" condition maintain two elements in the "on" condition. Fig. 3 is an embodiment of the invention which utilizes the second basic logical implication.

The components and means of Fig. 3, which are the same as those shown in Figs. 1 and 2, will be given the same reference numerals, and will not be discussed in detail. Each combinatorial grouping means includes three averaging resistors 37, 38, and 39 in place of the diodes used in the embodiment of Fig. 2. The averaging resistors provide the same logical operation as the diodes, except that the signal at the output end of each combinatorial grouping means is an average signal rather than an "on-off" signal. Only one bias resistor 34 is required for each combinatorial grouping means because the averaging resistors take the place of the first biasing resistor 35 shown in Fig. 2. The control terminal of each storage element is now connected to an "off" biasing or negative potential, not shown. If the storage elements comprise electron discharge tubes, such as those shown in Fig. 2, bias resistor 18, connected to the grid 17, is no longer connected to B+ but is connected to a source of negative voltage, not shown.

The value of each second biasing resistor 34, the magnitude of the source of biasing potential applied to terminal —E, the values of the averaging resistors, and the value of the negative potential are made such that each storage element is normally in an "off" condition unless an "on" control signal is applied to it. An "on" control signal is produced at the output end of a combinatorial grouping means when all storage elements connected to its input end are "off."

The terminals of the buffer diodes 45, 46, 47, and 48 have been reversed so that the anode of each diode is connected to the combinatorial grouping means output ends and the cathodes are connected to the storage element control terminals. The buffer diodes are arranged into gates 44 according to the sets of logical implications which are shown below. It should be understood that the buffer diodes shown in Fig. 3 can be arranged into diode buffer stages such as are shown in Fig. 2. For example, the buffer diodes 45*a* and 45*b* shown in Fig. 3 would be in a diode buffer stage 40*ab* similar to buffer stage 40*abc* of Fig. 2.

The basic set of logical implications for the embodiment shown in Fig. 3 is:

$$\bar{A}.\bar{B}.\bar{C}\rightarrow DE$$

$$\bar{A}.\bar{B}.\bar{D}\rightarrow CE$$

$$\bar{A}.\bar{B}.\bar{E}\rightarrow CD$$

$$\bar{A}.\bar{C}.\bar{D}\rightarrow BE$$

$$\bar{A}.\bar{C}.\bar{E}\rightarrow BD$$

$$\bar{A}.\bar{D}.\bar{E}\rightarrow BC$$

$$\bar{B}\,\bar{C}.\bar{D}\rightarrow AE$$

$$\bar{B}.\bar{C}.\bar{E}\rightarrow AD$$

$$\bar{B}.\bar{D}.\bar{E}\rightarrow AC$$

$$\bar{C}.\bar{D}.\bar{E}\rightarrow AB$$

For example, the implication $$\bar{A}.\bar{B}.\bar{C}\rightarrow DE$$

signifies that A, B, and C "off" implies D and E "on," or that the "off" signal from storage elements A, B, and C is used to produce an "on" control signal which is applied to D and E through a buffer circuit.

Two sets of logical implications which show the connections which are to be made to the control terminal of each storage element are:

$$\bar{C}.\bar{D}.\bar{E}+\bar{B}.\bar{D}.\bar{E}+\bar{B}.\bar{C}.\bar{E}+\bar{B}.\bar{C}.\bar{D}\rightarrow A$$

$$\bar{C}.\bar{D}.\bar{E}+\bar{A}.\bar{D}.\bar{E}+\bar{A}.\bar{C}.\bar{E}+\bar{A}.\bar{C}.\bar{D}\rightarrow B$$

$$\bar{B}.\bar{D}.\bar{E}+\bar{A}.\bar{D}.\bar{E}+\bar{A}.\bar{B}.\bar{E}+\bar{A}.\bar{B}.\bar{D}\rightarrow C$$

$$\bar{B}.\bar{C}.\bar{E}+\bar{A}.\bar{C}.\bar{E}+\bar{A}.\bar{B}.\bar{E}+\bar{A}.\bar{B}.\bar{C}\rightarrow D$$

$$\bar{B}.\bar{C}.\bar{D}+\bar{A}.\bar{C}.\bar{D}+\bar{A}.\bar{B}.\bar{D}+\bar{A}.\bar{B}.\bar{C}\rightarrow E$$

as a first set of logical implications and:

$$(C+D+E).(B+D+E).(B+C+E).(B+C+D)\rightarrow\bar{A}$$

$$(C+D+E).(A+D+E).(A+C+E).(A+C+D)\rightarrow\bar{B}$$

$$(B+D+E).(A+D+E).(A+B+E).(A+B+D)\rightarrow\bar{C}$$

$$(B+C+E).(A+C+E).(A+B+E).(A+B+C)\rightarrow\bar{D}$$

$$(B+C+D).(A+C+D).(A+B+D).(A+B+C)\rightarrow\bar{E}$$

as a second set of logical implications.

As in the case of the logic related to the embodiments shown in Fig. 1 and Fig. 2, the second set of logical implications is complementary to the first set and relates to the same structure. Again, the first and second sets can be derived from the basic sets by Boolean algebraic manipulation.

Structurally, the first set of logical implications signifies that each of the combinatorial grouping means 30 is an "and" gate which provides an "on" control signal when each of the signals at its input end is an "off" signal, and that the control terminal 19 of each storage element is connected to the output end of an "or" gate 44 which has its input ends connected to the output ends of those combinatorial grouping means which are not connected to the output terminal of the element which is to be controlled. For example, control terminal 19*a* of storage element A is connected to the output end of "or" gate 44*a* which has its input terminals connected to the output ends of combinatorial grouping means 30*cde*, 30*bde*, 30*bce*, and 30*bcd*.

The second set of logical implications signifies that each combinatorial grouping means 30 is an "or" gate which provides an "off" control signal when any one or more of the signals applied to it is an "on" signal, and that the control terminal of each storage element is connected to the output end of an "and" gate 44 which has its input ends connected to the output ends of all combinatorial grouping means not connected to the storage element to be controlled.

Fig. 4 is another embodiment of the invention in which a resistor matrix is utilized as a combinatorial grouping means. Four averaging resistors 61, 62, 63, and 64 are included in each combinatorial grouping means 30. One end of each of the averaging resistors in the combinatorial grouping means is connected to the output terminal of a storage element in the group. For example, in combinatorial grouping means 30*bcde*, averaging resistors 61, 62, 63, and 64 are connected, respectively, to the output terminals of storage elements B, C, D, and E. The other end of each of the averaging resistors in a combinatorial group is connected through a separate second biasing resistor 34 to the —E terminal of a source of biasing potential, not shown. The output end of each combinatorial grouping means is connected to control terminal lead 55 of the complementary storage element. For example, output end 32 of combinatorial grouping means 30*abce* is connected to control terminal lead 55*d*.

With proper biasing voltages and the proper selection of resistors, the circuit shown in Fig. 4 can be made to assume any combinatorial stable state desired. For example, if it is desired to have the circuit assume stable states representative of a combinatorial code wherein two storage elements are "on" at a time, then the biasing voltages and averaging resistors are selected so that the average signal at the output end of a combinatorial grouping means is an "off" control signal, when two of its input signals are "on" signals. While the embodiment shown in Fig. 4 appears simple in form, it requires very accurate averaging resistors and biasing voltages, and thus, for many purposes, the embodiments of Fig. 2 and Fig. 3 may be preferred.

In order to provide a storage device of the type herein described, which uses a minimum number of storage elements, it is necessary to combine the output terminals of the storage elements into a maximum number of combinatorial groups. When there is an even number of storage elements, the output terminals of the storage elements are connected into combinatorial groups each of which contains one-half of the total number of ouptut terminals. If eight storage elements are utilized, then the maximum number of stable states is obtained when four output terminals are connected into a combinatorial group at a time. When there is an odd number $n$ of storage elements, the output terminals of the storage elements are connected into combinatorial groups each of which contains $(n+1)/2$ or $(n-1)/2$ of the total number of output terminals. If five storage elements are utilized, then the maximum number of stable states is obtained when either two or three ouptut terminals are connected into a combinatorial group at a time.

From the above, it can be seen that the principle of the present invention will cover a wide variety of combinatorial output and complementary combinatorial control networks. A few examples have been given in order to point out the logic involved. However, it should be understood that the present invention is not limited to any specific number of elements, any specific number of elements taken in combination, or any specific network for mechanizing the logical implications.

In an operative embodiment of the invention of the type shown in Fig. 2, the following components were used:

| | |
|---|---|
| All storage elements use pentodes | Type 5763. |
| B+ voltage | 278 volts. |
| Screen voltage | 150 volts. |
| Suppressor grid grounded. | |
| Plate load resistor **13** | 3,900 ohms. |
| Plate load resistor **14** | 4,700 ohms. |
| First biasing resistor **35** | 47,000 ohms. |
| Second biasing resistor **34** | 68,000 ohms. |
| Grid bias resistors **18** | 1.5 megohms. |
| Clamping voltages | $E_1=+195$. $E_2=+215$. |
| Bias source voltage applied to terminal —E | —230 volts. |
| All diodes | Type 1N39. |

What is claimed as new is:

1. A multiple-stable-state storage device comprising at least three two-state storage elements combinable into a plurality of combinatorial groups, and control means electrically coupled between the storage elements of each one of said combinatorial groups and the remainder of said storage elements, said control means being responsive to a predetermined one of the two states of each of the storage elements of said one combinatorial group for maintaining the remainder of said storage elements in the other of said two states.

2. A multiple-stable-state storage device comprising $n$ storage elements each having two operating states, said elements being arrangeable into a plurality of combinatorial groups each containing $r$ of said storage elements, where $n$ is an integer greater than two and $r$ is an integer less than $n$, and means responsive to a predetermined one of said states in each of the $r$ storage elements in a combinatorial group for maintaining the complementary group of $(n-r)$ storage elements in the other of said states.

3. The multiple-state storage device defined in claim 2 wherein said means includes a plurality of "and" gates corresponding to said plurality of groups, respectively, each of said "and" gates having a plurality of input terminals and a single output terminal, and buffer means coupling said output terminal to each of the storage elements in the complementary group of $(n-r)$ storage elements.

4. The multiple-state storage device defined in claim 2 wherein said means includes a plurality of "and" gates for producing a control signal to maintain said $(n-r)$ elements in said other state, and a plurality of "or" gates for applying said control signal to said $(n-r)$ elements.

5. The multiple-state storage device defined in claim 2 wherein said means includes a plurality of "or" gates for producing a control signal to maintain said $(n-r)$ elements in said other state, and a plurality of "and" gates for applying said control signal to said $(n-r)$ elements.

6. The multiple-stable-state storage device defined in claim 2 wherein said $n$ storage elements are electron discharge tubes, said tubes being in one of said states during conduction and being in the other of said states during non-conduction.

7. The multiple-stable-state storage device defined in claim 2 wherein $n$ is equal to 5 and $r$ is equal to 2.

8. The multiple-stable-state storage device defined in claim 2 wherein $n$ is equal to 5 and $r$ is equal to 3.

9. The multiple-stable-state storage device comprising a plurality of two-state elements each having input and output circuits, said output circuits being arrangeable into a first plurality of combinatorial groups and said input circuits being arrangeable into a second plurality of combinatorial groups complementary to said first plurality of groups, respectively, means for coupling each of said first plurality of groups to its complementary combinatorial group, said means including a plurality of impedances for connecting said output circuits into said first plurality of groups, each of said groups having an output end, means for coupling the output end of each of said first plurality of groups to its complementary combinatorial group of input circuits, means for applying signals representative of information to be stored to the input circuits of said two-state elements, and means connected to said output ends for utilizing information stored in said device.

10. The multiple-stable-state storage device defined in claim 9 wherein said impedances are interconnected into a resistance matrix.

11. A multiple-state storage device comprising a plurality of two-state storage elements each having at least an input circuit and an output circuit; and means for coupling combinatorial groups of said output circuits to complementary combinatorial groups of said input circuits, respectively, said means including a plurality of impedances for connecting said output circuits into a first plurality of combinatorial groups, a plurality of rectifiers for connecting said input circuits into a second plurality of combinatorial groups complementary to said first plurality of groups, respectively, and means for connecting each group of said first plurality of groups to its complementary group of said second plurality of groups.

12. An electronic circuit having a plurality of stable states, said circuit comprising a plurality of electron discharge tubes each having an anode, a cathode and a control grid; and means for coupling combinatorial groups of the anodes of said tubes to complementary combinatorial groups of the grids of said tubes, respectively, said means including a plurality of impedances for connecting the anodes of said tubes into a first plurality of combinatorial groups, and a plurality of diodes for connecting the grids of said tubes into a second plurality of combinatorial groups complementary to said first plurality of groups, respectively, each group of said first plurality of groups having an output end connected to its complementary group of said second plurality of groups.

13. The electronic circuit defined in claim 12 wherein said impedances are resistors.

14. The electronic circuit defined in claim 12 wherein said impedances include a plurality of diodes for connecting the anodes of said tubes into said first plurality of combinatorial groups, and a plurality of resistors, one end of each of said resistors being connected to the diodes of one group of said first plurality of combinatorial groups, the other end of each of said resistors providing said output end.

15. The multiple-stable-state storage device defined in claim 2 wherein $n$ is equal to 5 and $r$ is equal to 2, said storage elements being designated as A, B, C, D, and E, respectively, and wherein the stable states of said elements can be represented by the following set of logical Boolean implications:

$A.B \rightarrow \overline{C}\overline{D}\overline{E}$ $A.C \rightarrow \overline{B}\overline{D}\overline{E}$ $B.C \rightarrow \overline{A}\overline{D}\overline{E}$ $A.D \rightarrow \overline{B}\overline{C}\overline{E}$ $A.E \rightarrow \overline{B}\overline{C}\overline{D}$ $B.E. \rightarrow \overline{A}\overline{C}\overline{D}$ $B.D \rightarrow \overline{A}\overline{C}\overline{E}$ $C.D \rightarrow \overline{A}\overline{B}\overline{E}$ $C.E \rightarrow \overline{A}\overline{B}\overline{D}$ $D.E \rightarrow \overline{A}\overline{B}\overline{C}$ the dot (.) representing the logical "and," the arrow (→) the logical implication, and the signals $\overline{A}$, $\overline{B}$, $\overline{C}$, $\overline{D}$, $\overline{E}$ indicating the complementary state of the corresponding element.

16. The multiple-stable-state storage device defined in claim 2 wherein $n$ is equal to 5 and $r$ is equal to 3, said storage elements being designated as A, B, C, D, and E, respectively, and wherein the stable states of said elements can be represented by the following set of logical implications:

$\overline{A}.\overline{B}.\overline{C} \rightarrow DE$ $\overline{A}.\overline{B}.\overline{D} \rightarrow CE$ $\overline{A}.\overline{B}.\overline{E} \rightarrow CD$ $\overline{A}.\overline{C}.\overline{D} \rightarrow BE$ $\overline{A}.\overline{C}.\overline{E} \rightarrow BD$ $\overline{A}.\overline{D}.\overline{E} \rightarrow BC$ $\overline{B}.\overline{C}.\overline{D} \rightarrow AE$ $\overline{B}.\overline{C}.\overline{E} \rightarrow AD$ $\overline{B}.\overline{D}.\overline{E} \rightarrow AC$ $\overline{C}.\overline{D}.\overline{E} \rightarrow AB$ the dot (.) representing the logical "and," the arrow (→) the logical implication, and the signals $\overline{A}$, $\overline{B}$, $\overline{C}$, $\overline{D}$, and $\overline{E}$ indicating the complementary state of the corresponding element.

17. A multiple-stable-state storage device comprising: two-state elements A, B, C, D, and E, each having input and output circuits, one state of said elements being represented by the signals A, B, C, D, and E, respectively, and the complementary state being represented by the signals $\overline{A}$, $\overline{B}$, $\overline{C}$, $\overline{D}$, and $\overline{E}$ said output circuits being arrangeable into a first plurality of combinatorial groups AB, AC, BC, AD, AE, BE, BD, CE, CD, and DE, said input circuits being arrangeable into a second plurality of combinatorial groups complementary to said first plurality of groups, respectively, said second plurality of groups being designated as CDE, BDE, ADE, BCE, BCD, ACD, ACE, ABD, ABE, and ABC; means for coupling each of said first plurality of groups to its complementary combinatorial group in accordance with the logical implications:

$A.B \rightarrow \overline{C}\overline{D}\overline{E}$ $A.C \rightarrow \overline{B}\overline{D}\overline{E}$ $B.C \rightarrow \overline{A}\overline{D}\overline{E}$ $A.D \rightarrow \overline{B}\overline{C}\overline{E}$ $A.E \rightarrow \overline{B}\overline{C}\overline{D}$ $B.E \rightarrow \overline{A}\overline{C}\overline{D}$ $B.D \rightarrow \overline{A}\overline{C}\overline{E}$ $C.E \rightarrow \overline{A}\overline{B}\overline{D}$ $C.D \rightarrow \overline{A}\overline{B}\overline{E}$ $D.E \rightarrow \overline{A}\overline{B}\overline{C}$ where the dot (.) represents the logical "and" and the arrow ($\rightarrow$) the logical implication, these implications being also representable as:

$$B.C+B.E+B.D+C.E+C.D+D.E\rightarrow\bar{A}$$
$$A.C+A.D+A.E+C.E+C.D+D.E\rightarrow\bar{B}$$
$$A.B+A.D+A.E+B.E+B.D+D.E\rightarrow\bar{C}$$
$$A.B+A.C+B.C+A.E+B.E+C.E\rightarrow\bar{D}$$
$$A.B+A.C+B.C+A.D+B.D+C.D\rightarrow\bar{E}$$

the plus sign (+) representing the logical "or,"; and logical mechanization means including an "and" circuit for providing a signal corresponding to each "and" condition in said implications and an "or" circuit corresponding to each "or" condition in said implications.

18. A multiple-stable-state storage device comprising: two-state elements A, B, C, D, and E, each having input and output circuits, one state of said elements being represented by the signals A, B, C, D, and E, respectively, and the complementary state being represented by the signals $$\bar{A},\ \bar{B},\ \bar{C},\ \bar{D},\ \text{and}\ \bar{E}$$

said output circuits being arrangeable into a first plurality of combinatorial groups ABC, ABD, ABE, ACD, ACE, ADE, BCD, BCE, BDE, and CDE, said input circuits being arrangeable into a second plurality of combinatorial groups complementary to said first plurality of groups, respectively, said second plurality of groups being designated as DE, CE, CD, BE, BD, BC, AE, AD, AC, and AB; means for coupling each of said first plurality of groups to its complementary combinatorial group in accordance with the logical imlications:

$$\bar{A}.\bar{B}.\bar{C}\rightarrow DE$$
$$\bar{A}.\bar{B}.\bar{D}\rightarrow CE$$
$$\bar{A}.\bar{B}.\bar{E}\rightarrow CD$$
$$\bar{A}.\bar{C}.\bar{D}\rightarrow BE$$
$$\bar{A}.\bar{C}.\bar{E}\rightarrow BD$$
$$\bar{A}.\bar{D}.\bar{E}\rightarrow BC$$
$$\bar{B}.\bar{D}.\bar{E}\rightarrow AC$$
$$\bar{C}.\bar{D}.\bar{E}\rightarrow AB$$
$$\bar{B}.\bar{C}.\bar{D}\rightarrow AE$$
$$\bar{B}.\bar{C}.\bar{E}\rightarrow AD$$

where the dot (.) represents the logical "and" and the ($\rightarrow$) the logical implication, these implications being also representable as:

$$\bar{C}.\bar{D}.\bar{E}+\bar{B}.\bar{D}.\bar{E}+\bar{B}.\bar{C}.\bar{E}+\bar{B}.\bar{C}.\bar{D}\rightarrow A$$
$$\bar{C}.\bar{D}.\bar{E}+\bar{A}.\bar{D}.\bar{E}+\bar{A}.\bar{C}.\bar{E}+\bar{A}.\bar{C}.\bar{D}\rightarrow B$$
$$\bar{B}.\bar{D}.\bar{E}+\bar{A}.\bar{D}.\bar{E}+\bar{A}.\bar{B}.\bar{E}+\bar{A}.\bar{B}.\bar{D}\rightarrow C$$
$$\bar{B}.\bar{C}.\bar{E}+\bar{A}.\bar{C}.\bar{E}+\bar{A}.\bar{B}.\bar{E}+\bar{A}.\bar{B}.\bar{C}\rightarrow D$$
$$\bar{B}.\bar{C}.\bar{D}+\bar{A}.\bar{C}.\bar{D}+\bar{A}.\bar{B}.\bar{D}+\bar{A}.\bar{B}.\bar{C}\rightarrow E$$

as a first set of logical implications and:

$$(C+D+E).(B+D+E).(B+C+E).(B+C+D)\rightarrow\bar{A}$$
$$(C+D+E).(A+D+E).(A+C+E).(A+C+D)\rightarrow\bar{B}$$
$$(B+D+E).(A+D+E).(A+B+E).(A+B+D)\rightarrow\bar{C}$$
$$(B+C+E).(A+C+E).(A+B+E).(A+B+C)\rightarrow\bar{D}$$
$$(B+C+D).(A+C+D).(A+B+D).(A+B+C)\rightarrow\bar{E}$$

as a second set of logical implications, the plus sign (+) representing the logical "or,"; and logical mechanization means including an "and" circuit for providing a signal corresponding to each "and" condition in said implications and an "or" circuit corresponding to each "or" condition in said implications.

References Cited in the file of this patent

UNITED STATES PATENTS

| | | |
|---|---|---|
| 2,428,811 | Rajchman | Oct. 14, 1947 |
| 2,577,141 | Mauchly, et al. | Dec. 4, 1951 |
| 2,590,950 | Eckert Jr., et al. | Apr. 1, 1952 |
| 2,636,133 | Hussey | Apr. 21, 1953 |
| 2,696,600 | Serrell | Dec. 7, 1954 |